Patented Nov. 16, 1937

2,098,984

UNITED STATES PATENT OFFICE 2,098,984

DEHYDRO-STEROL COMPOUNDS AND MANUFACTURE THEREOF

Adolf Windaus and Friedrich Schenck, Gottingen, Germany, assignors to Winthrop Chemical Company, Inc., New York, N. Y., a corporation of New York No Drawing. Application March 18, 1936, Serial No. 69,590. In Germany March 20, 1935

13 Claims. (Cl. 260—153)

This invention relates to the manufacture of 7-dehydrosterol compounds and to products obtainable by such a manufacture; more particularly it relates to the manufacture of 7-dehydrosterol compounds containing in ring II of the sterol ring system two conjugated double bonds. Accordingly, the structure of the tetracyclic ring system of the sterol compounds obtainable in accordance with the present invention is the following:

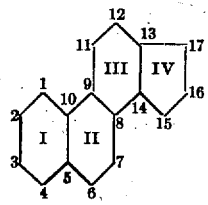

The Roman numerals indicate the usual numbering of the four rings and the Arabic numerals indicate the usual numbering of the carbon atoms of the sterol ring system.

In accordance with the present invention the said 7-dehydrosterol compounds are obtainable from well available sterols by starting with sterol compounds containing in ring II a keto group and a double bond in $\alpha$, $\beta$-position thereto, or with esters of such sterol compounds, transforming the keto group by reduction with mild reducing agents into the hydroxyl group while simultaneously maintaining the carbon double bonds of the sterol compound, and then splitting off the hydroxyl group in the form of water or, preferably, after esterification in the form of an acid to produce a new double bond in ring II which stands in conjugated position to the other double bond originally present in ring II of the sterol compound. When starting, for instance, with 7-oxo-cholesterol the production of 7-dehydrocholesterol proceeds in accordance with the following reaction scheme:—

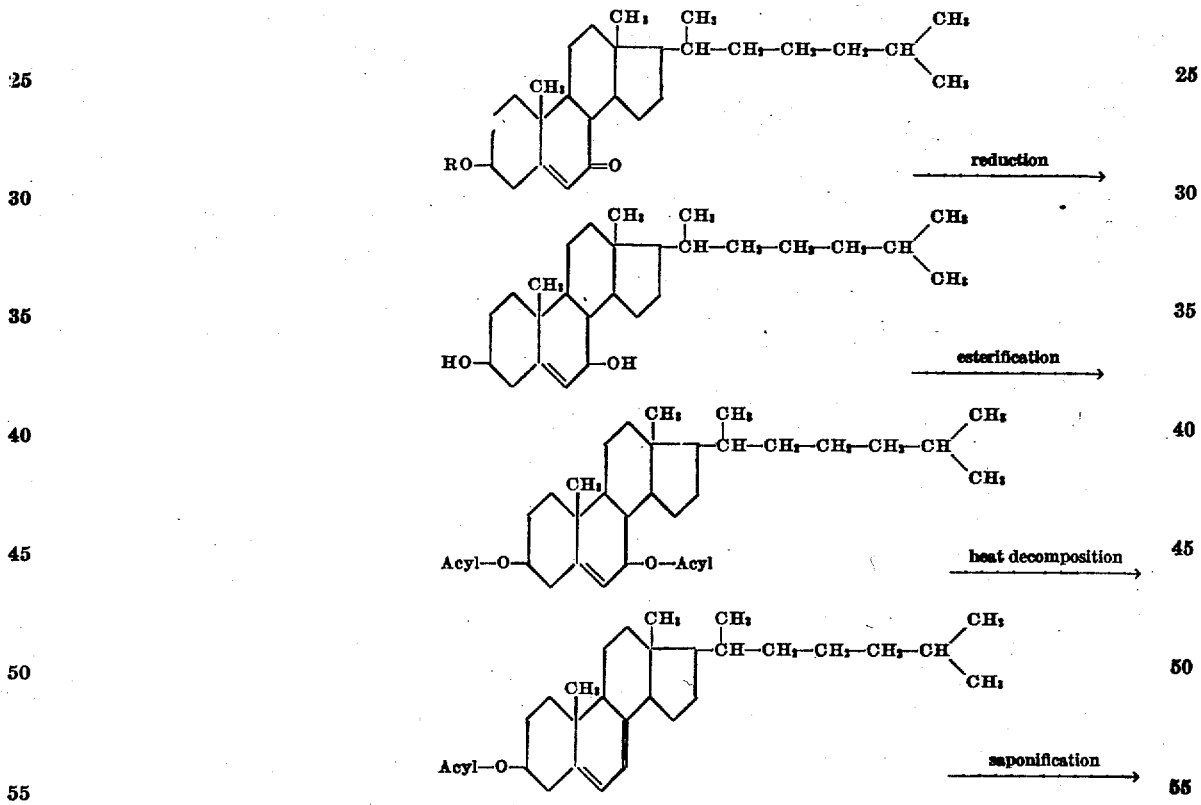

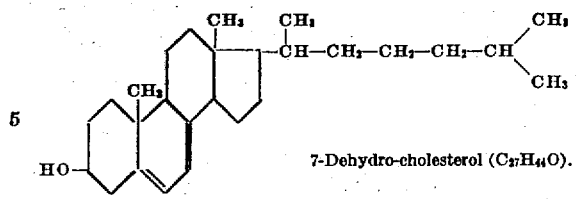

7-Dehydro-cholesterol ($C_{27}H_{44}O$).

In the first formula R stands for hydrogen or an acyl radical.

In an analogous manner 7-dehydro-sitosterol ($C_{29}H_{48}O$) and 7-dehydro-stigmasterol ($C_{29}H_{46}O$) of the formulae:

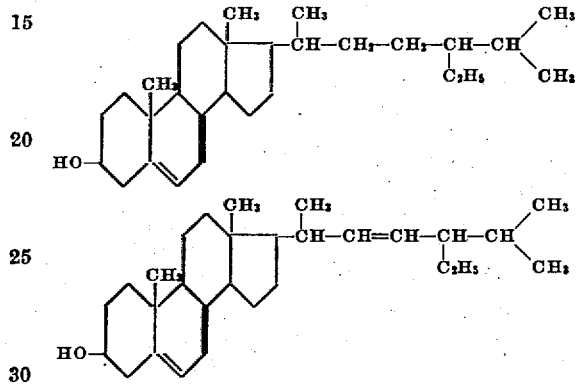

are obtainable.

The keto derivatives of the sterols used as starting material may be obtained by oxidation of the esterified sterols, for instance by means of chromic acid in the manner known per se. Advantageously the ester derivatives of the keto sterols which are thus obtained are directly used for the reduction with the mild reducing agent. As such preferably an aluminium alcoholate is used, for instance aluminium methylate, ethylate, propylate and the like. Particularly suitable have proved the alcoholates of secondary alcohols, for instance aluminium isopropylate, isobutylate and isoamylate. Likewise the alcoholates of other earth metals have proved to be suitable, furthermore, for instance magnesium and zirconium alcoholates. Generally speaking metal alcoholates may be used which are capable of reducing aldehyde and keto groups to hydroxyl groups but do not develop free hydrogen in the reducing process. The reduction is advantageously carried out in the presence of excess alcohol, preferably of that alcohol which is present in the metal alcoholate.

By removal of the hydroxyl group produced in the aforementioned reduction process, the second double bond standing in conjugated position to the originally present double bond is produced in ring II. The above reaction scheme shows the production of the second double bond in ring II by splitting off acid after previous esterification of the hydroxyl group. This esterification is preferably effected by means of benzoyl chloride, for instance in the presence of pyridine or quinoline. This procedure appears to yield better results than the production of the said double bond by directly splitting off water from the non-esterified hydroxyl compound which, however, may also be performed advantageously in the presence of such agents as are known to facilitate the splitting off of water from organic compounds for instance, oxalic acid, benzoic acid anhydride and the like. By heat treatment of the diacylated hydroxyl compound only one mol. of acid, for instance benzoic acid, is split off with the production of the double bond in ring II, whereas the acyl group standing in the 3-position remains unchanged. The 7-dehydro-3-acyl compounds are transformed into the 7-dehydro-sterols by saponification in the usual manner, for instance, by means of alkali in alcoholic solution. Caustic alkali and alkaline-earth metal hydroxides may be employed as the saponifying agents.

The 7-dehydro-sterols thus obtainable form white crystals. From their solution they may be precipitated by digitonin in the usual manner. They show an absorption spectrum which is similar to that of ergosterol. It is most surprising that when, for instance, subjecting 7-dehydrocholesterol to ultra-violet irradiation in the manner known per se an antirachitically active product is obtained. Accordingly, the new products render it possible to transform well available sterol compounds which per se cannot be antirachitically activated into antirachitically active products.

The invention is further illustrated by the following examples without being restricted thereto:

Example 1.—25 grams of stigmasterol acetate are dissolved in 1000 ccs. of hot glacial acetic acid which is stable to chromic acid and after cooling to 50° C. gradually treated within three hours with a solution of 20 grams of chromic acid anhydride in 900 ccs. of glacial acetic acid. The oxidation solution is kept at a temperature of 50° C. for 9 hours. The acetic acid solution which has turned green is concentrated under reduced pressure, diluted with water and extracted with ether. The ether extract is freed from acid constituents by washing with dilute caustic soda solution and after drying by means of sodium sulfate concentrated to a small volume. The residue is diluted with methanol, freed from ether by heating to boiling and the methyl-alcoholic solution is treated with water while hot until turbidity commences. On cooling the oxidation product separates in leaflets. For further purification the product is recrystallized from hot methanol. The 7-oxo-stigmasterol acetate obtained in this manner melts at 183° C.

The 7-hydroxystigmasterol is obtained by dissolving 10 grams of 7-oxo-stigmasterol acetate in 200 ccs. of isopropyl alcohol, treating the solution with 20 grams of liquefied aluminium-isopropylate and boiling for 4 hours under reflux. After the reduction is complete the yellow, green-fluorescent solution is diluted with ether and freed from aluminium and isopropyl alcohol by washing with dilute hydrochloric acid. The colorless ether extract is evaporated after drying and the residue taken up in a small quantity of methanol. After several hours the 7-hydroxy-stigmasterol has separated in tufts of thin needles which are recrystallized from methanol. The 7-hydroxy-stigmasterol melts at 154° C. On heating with chloral hydrate a deep blue melt is obtained after a few seconds. Reactions according to Salkowski: sulfuric acid red, chloroform blue, intensive green fluorescence.

3.5 grams of 7-hydroxy-stigmasterol are dissolved in 200 ccs. of pyridine and treated with a solution of 5 ccs. of benzoyl chloride in 10 ccs. of pyridine. The mixture is heated for 30 minutes on the water-bath, diluted after cooling with ether, extracted with water and dilute hydrochloric acid for removing the pyridine. The dried ether extract is concentrated to a small volume and treated with methanol until turbidity occurs. If the dibenzoate should separate as a jelly, ether is added until solution is complete. After standing for a prolonged time the dibenzoate separates in thin woolly needles. It is purified by recrystallization from ether-methanol. The 7-hydroxy-stigmasterol-dibenzoate melts at 154-158° C. and displays the same color reactions as the 7-hydroxy-stigmasterol.

2.13 grams of 7-hydroxy-stigmasterol-dibenzoate are heated in a water-jet vacuum (10-12 mm. pressure) to 190-200° C. until about 0.3 gram, that is 60% of the theoretical quantity of benzoic acid (theoretically 0.49 gram) are split off. The melt is dissolved in a small quantity of ether after cooling. After standing for a short time the monobenzoate of the 7-dehydrostigmasterol separates from the ethereal solution in thin needles. For further purification the solution is recrystallized from ether-methanol. The 7-dehydrostigmasterol-benzoate melts at 178-180° C. It is difficultly soluble in methanol, slightly soluble in ether and acetone. Further quantities of monobenzoate may be obtained from the mother lyes by heating again and working up in the above described manner.

10 parts by weight of a 5% alcoholic caustic soda solution are introduced into a solution of 7-dehydrostigmasterol-benzoate in benzene. The mixture is heated to boiling and the solvent distilled off after boiling for half an hour until crystallization occurs. The crude product is recrystallized from ether-methanol for purification.

7-dehydrostigmasterol crystallizes in long, thin needles and melts at 153° C. It is difficultly soluble in methyl- and ethyl-alcohol, more readily soluble in ether or acetone and displays with antimony trichloride the color reaction of ergosterol (red-blue), yields the ergosterol spectrum and can be precipitated with digitonin.

*Example 2*.—For obtaining 7-hydroxy-cholesterol 50 grams of 7-oxo-cholesteryl acetate are dissolved in 500 ccs. of dry isopropyl alcohol and after the addition of 20 grams of liquefied aluminium isopropylate heated to boiling for 5 hours. After reduction is complete with the simultaneous splitting off of the acetyl group the isopropylalcoholic solution is diluted with ether. The ethereal solution is first extracted with normal hydrochloric acid, then, after removing the aluminium hydroxide, with water. The dried ethereal solution is concentrated to about 100-150 ccs. and treated with the five-fold quantity of petroleum ether, whereupon abundant quantities of the 7-hydroxy cholesterol separate in colorless jelly balls which are filtered with suction and washed with petroleum ether. By evaporating the mother liquor to a small volume and by diluting with petroleum ether further quantities of 7-hydroxy-cholesterol may be obtained. It yields immediately an intensive blue coloration when heated on the water bath with chloral hydrate. In the Salkowski reaction the sulfuric acid takes a red coloration, the chloroform a blue coloration, an intensive green fluorescence occurs simultaneously. With antimony trichloride in chloroform a deep blue coloration is obtained after a short time.

For obtaining 7-hydroxycholesterol-dibenzoate 30 grams of 7-hydroxy-cholesterol are dissolved in 200 ccs. of pyridine and treated with a mixture of 30 grams of benzoyl chloride and 30 grams of pyridine. After standing for 24 hours the benzoylation product is precipitated with 600 ccs. of water. The oily precipitate after settling is again shaken with 500 ccs. of fresh water. The water is poured off and the crude benzoate, covered with methyl alcohol, is left standing for several hours, whereupon it gradually turns to a white crystal powder. The latter is filtered, washed with methyl alcohol and recrystallized from ether-methyl alcohol for further purification. In this manner thin needles are obtained in a good yield which melt at 170° C. The 7-hydroxy-cholesterol-dibenzoate displays the same color reactions as the 7-hydroxy-cholesterol.

For transforming into the 7-dehydrocholesterol-benzoate the 7-hydroxycholesterol-dibenzoate is heated in portions of 2 grams each for one hour at 190-200° C. at about 1 mm. pressure. Besides benzoic acid small quantities of oily constituents distil over which are removed before further working up. The glass-like mass remaining after heating—about 60% of the dibenzoate employed—is dissolved with ether or acetone and the solution concentrated to a small volume. After standing for a short time the monobenzoate of the 7-dehydrocholesterol separates in crystals. The crude monobenzoate is purified by recrystallization from ether or acetone. In this manner thin leaflets are obtained which yield a turbid melt at 142-143° C. which becomes clear at 190° C. The product displays the same color reactions as the non-esterified 7-hydroxycholesterol.

For transforming into the 7-dehydrocholesterol 10 grams of 7-dehydrocholesterol-benzoate are dissolved in 50 ccs. of benzene and treated with 200 ccs. of a 5% ethyl-alcoholic caustic potash solution by heating to boiling. After boiling for half an hour under reflux the solvent is distilled off eventually with subsequent addition of ethyl alcohol until the benzene is removed and crystallization commences. The 7-dehydrocholesterol is filtered off after cooling and purified by recrystallization from ether-methyl-alcohol. The 7-dehydrocholesterol which is obtained in almost theoretical yield crystallizes in thin leaflets, melts at 149-150° C., may be precipitated with digitonin and has an absorption spectrum which resembles that of the ergosterol. The specific rotation of 7-dehydrocholesterol in chloroform is $$[\alpha]_D^{20} = -124°$$

It is difficultly soluble in methyl alcohol, readily soluble in ether and displays with antimony trichloride in chloroform the color reaction of the ergosterol (red-blue).

The dehydro-cholesterol may also directly be obtained from 7-hydroxycholesterol by heating the latter compound with anhydrous oxalic acid or benzoic acid anhydride for some time in nitrogen atmosphere to a higher temperature, for instance, 180-190° C. A brownish colored melt is obtained which is dissolved in ether, diluted with methanol, treated with a quantity of 10% methyl-alcoholic caustic potash solution which is equivalent to the quantity of oxalic acid or benzoic acid anhydride employed, for saponifying the ester eventually formed, the ether and the greatest part of the methyl alcohol are then distilled off. On cooling of the concentrated methyl-alcoholic solution the dehydro-cholesterol separates in crystals.

*Example 3*.—For obtaining the 7-hydroxysitosterol 100 grams of sitosterol acetate are dissolved in 5 liters of hot glacial acetic acid, treated after cooling to 50-60° C. with a solution of 90 grams of chromic acid anhydride in glacial acetic acid and kept at a temperature of 50-60° C. for 5 hours. The glacial acetic acid solution is concentrated to about 300 ccs. under reduced pressure, the residue is extracted with ether and the ether extract freed from acid constituents by extraction with sodium carbonate solution. The ether extract is concentrated to a small volume and treated with methanol until crystallization commences. The crude product is recrystallized from ether-methanol. The 7-oxo-sitosterol acetate melts at 154° C., crystallizes in leaflets, is readily soluble in ether and acetone and difficultly soluble in methyl alcohol.

For transforming into the 7-hydroxy-sitosterol 25 grams of 7-oxo-sitosterol acetate are dissolved in 250 ccs. of dry isopropyl alcohol, 10 grams of aluminium-isopropylate are added and the mixture heated to boiling for 5 hours under reflux. After reduction is complete with simultaneous splitting off of the acetyl group the solution is poured into about 3 liters of 0.5% aqueous caustic soda solution. The reduction product which separates in flakes is filtered off, the residue is dissolved in ether, the ethereal solution filtered and evaporated to about 100 ccs. and treated with 300 ccs. of petroleum ether. Thereupon the crude 7-hydroxy-sitosterol separates in the form of small jelly balls.

For obtaining the 7-hydroxy-sitosterol-dibenzoate 20 grams of 7-hydroxy-sitosterol are dissolved in 150 ccs. of pyridine, treated with 25 ccs. of benzoyl chloride and left standing for 15 hours at room temperature. The pyridine solution is diluted with ether-water, the ether extract is freed from pyridine by means of dilute hydrochloric acid, washed until free from acid, dried over sodium sulfate and concentrated to about 50 ccs. On treating the ethereal solution with methanol until turbidity occurs, the dibenzoate separates in thin needles. The 7-hydroxy-sitosterol-dibenzoate melts after recrystallization from ether-methanol or acetone-methanol at 155° C.

For transformation into the 7-dehydro-sitosterol-benzoate the 7-hydroxy-sitosterol-dibenzoate is heated in portions of 1 gram each in high vacuo for half an hour. Thereupon benzoic acid and oily constituents separate which before further working up are dissolved and removed. The residue obtained after heating is dissolved in ether, the ethereal solution is concentrated to a small volume and treated with methanol until turbidity occurs. The monobenzoate which separates is recrystallized from ether-methyl alcohol for further purification. The 7-dehydro-sitosterol-benzoate crystallizes in needles and melts at 144–146° C.

For obtaining the 7-dehydro-sitosterol 1 gram of 7-dehydro-sitosterol-benzoate is dissolved in 10 ccs. of hot benzene and treated with 30 ccs. of 5% sodium methylate solution by heating to boiling. The solvent is then distilled off until crystallization commences. For further purification the solution is recrystallized from ether-methyl alcohol. The 7-dehydro-sitosterol crystallizes in large leaflets. It melts at 148–150° C. and is readily soluble in ether, difficultly soluble in methyl- or ethyl alcohol. It may be precipitated with digitonin. On treating its chloroform solution with antimony trichloride red coloration immediately takes place which after some standing turns to blue. The absorption spectrum is similar to that of ergosterol.

We claim:—

1. Dehydrosterol compounds selected from the group consisting of 7-dehydrocholesterol, 7-dehydrositosterol and 7-dehydrostigmasterol.

2. 7-dehydrocholesterol, having in the crystalline form a melting of 149–150° C., being precipitated from its solution by digitonin.

3. The process which comprises reacting upon an esterified sterol compound containing in ring II a keto group and a double bond in $\alpha, \beta$-position thereto with an alcoholate of a metal selected from the group consisting of earth metals, zirconium and magnesium to reduce the 7-keto group to the 7-hydroxyl group, esterifying the hydroxyl groups of the reduction product, heating the diacyl compound formed to split off the acyl radical in the 7-position in the form of acid with the production of a 7-dehydro compound and saponifying the 7-dehydro-monoester compound.

4. The process which comprises reacting upon an esterified sterol compound containing in ring II a keto group and a double bond in $\alpha, \beta$-position thereto with an aluminium alcoholate to reduce the 7-keto group to the 7-hydroxyl group, esterifying the hydroxyl groups of the reduction product, heating the diacyl compound formed to split off the acyl radical in the 7-position in the form of acid with the production of a 7-dehydro compound and saponifying the 7-dehydro-monoester compound.

5. The process which comprises reacting upon an acetylated sterol compound containing in ring II a keto group and a double bond in $\alpha, \beta$-position thereto with an alcoholate of a metal selected from the group consisting of earth metals, zirconium and magnesium to reduce the 7-keto group to the 7-hydroxyl group, esterifying the hydroxyl groups of the reduction product, heating the diacyl compound formed to split off the acyl radical in the 7-position in the form of acid with the production of a 7-dehydro compound and saponifying the 7-dehydro-monoester compound.

6. The process which comprises reacting upon an esterified sterol compound containing in ring II a keto group and a double bond in $\alpha, \beta$-position thereto with an alcoholate of a metal selected from the group consisting of earth metals, zirconium and magnesium to reduce the 7-keto group to the 7-hydroxyl group, benzoylating the hydroxyl groups of the reduction product, heating the dibenzoyl compound formed to split off the benzoic radical in the 7-position in the form of benzoic acid with the production of a 7-dehydro compound and saponifying the 7-dehydro-monobenzoyl compound.

7. The process which comprises reacting upon an esterified sterol compound containing in ring II a keto group and a double bond in $\alpha, \beta$-position thereto with an aluminium alcoholate to reduce the 7-keto group to the 7-hydroxyl group, benzoylating the hydroxyl groups of the reduction product, heating the dibenzoyl compound formed to split off the benzoyl radical in the 7-position in the form of benzoic acid with the production of a 7-dehydro compound and saponifying the 7-dehydro-monobenzoyl compound.

8. The process which comprises reacting upon an acetylated sterol compound containing in ring II a keto group and a double bond in $\alpha, \beta$-position thereto with an aluminium alcoholate to reduce the 7-keto group to the 7-hydroxyl group, benzoylating the hydroxyl groups of the reduction product, heating the dibenzoyl compound formed to split off the benzoyl radical in the 7-position in the form of benzoic acid with the production of a 7-dehydro compound and saponifying the 7-dehydro-monobenzoyl compound.

9. The process which comprises reacting upon a 7-oxo-cholesterol ester with an alcoholate of a metal selected from the group consisting of earth metals, zirconium and magnesium to reduce the 7-keto group to the 7-hydroxyl group, esterifying the hydroxyl groups of the reduction product, heating the diacyl compound formed to split off the acyl radical in the 7-position in the form of acid with the production of a 7-dehydro cholesterol-ester and saponifying the latter compound.

10. The process which comprises reacting upon a 7-oxo-cholesterol ester with an aluminium alcoholate to reduce the 7-keto group to the 7-hydroxyl group, esterifying the hydroxyl groups of the reduction product, heating the diacyl compound formed to split off the acyl radical in the 7-position in the form of acid with the production of a 7-dehydro cholesterol-ester and saponifying the latter compound.

11. The process which comprises reacting upon a 7-oxo-cholesterol ester with an alcoholate of a metal selected from the group consisting of earth metals, zirconium and magnesium to reduce the 7-keto group to the 7-hydroxyl group, benzoylating the hydroxyl groups of the reduction product, heating the dibenzoyl compound formed to split off the benzoyl radical in the 7-position in the form of benzoic acid with the production of 7-dehydro cholesterol-benzoate and saponifying the latter compound.

12. The process which comprises reacting upon 7-oxo-cholesterol acetate with an aluminium alcoholate to reduce the 7-oxo-group to the 7-hydroxyl group, benzoylating the hydroxyl groups of the reduction product, heating the dibenzoate formed to split off the benzoyl radical in the 7-position in the form of benzoic acid with the formation of 7-dehydrocholesterol monobenzoate and saponifying the latter compound.

13. The process which comprises reacting upon 7-oxo-cholesterol acetate with aluminium isopropylate to reduce the 7-oxo group to the 7-hydroxyl group, benzoylating the hydroxyl groups of the reduction product, heating the dibenzoate formed to split off the benzoyl radical in the 7-position in the form of benzoic acid with the formation of 7-dehydrocholesterol monobenzoate and saponifying the latter compound.

ADOLF WINDAUS.
FRIEDRICH SCHENCK.

Certificate of Correction

Patent No. 2,098,984.      November 16, 1937.

ADOLF WINDAUS ET AL.

It is hereby certified that error appears in the printed specification of the above numbered patent requiring correction as follows: Page 1, first column, lines 11 to 18, inclusive, for the formula

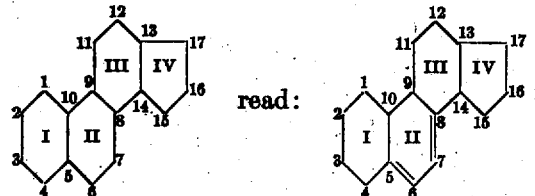

and that the said Letters Patent should be read with this correction therein that the same may conform to the record of the case in the Patent Office.

Signed and sealed this 1st day of March, A. D. 1938.

[SEAL]

HENRY VAN ARSDALE,
*Acting Commissioner of Patents.*

Disclaimer 2,098,984.—*Adolf Windaus* and *Friedrich Schenck*, Gottingen, Germany, DEHYDRO-STEROL COMPOUNDS AND MANUFACTURE THEREOF. Patent dated Nov. 16, 1937. Disclaimer filed Jan. 30, 1951, by the assignee, *E. I. du Pont de Nemours and Company.*

Hereby enters this disclaimer to claims 1 and 2 of said patent.
[*Official Gazette February 27, 1951.*]

a 7-oxo-cholesterol ester with an alcoholate of a metal selected from the group consisting of earth metals, zirconium and magnesium to reduce the 7-keto group to the 7-hydroxyl group, esterifying the hydroxyl groups of the reduction product, heating the diacyl compound formed to split off the acyl radical in the 7-position in the form of acid with the production of a 7-dehydro cholesterol-ester and saponifying the latter compound.

10. The process which comprises reacting upon a 7-oxo-cholesterol ester with an aluminium alcoholate to reduce the 7-keto group to the 7-hydroxyl group, esterifying the hydroxyl groups of the reduction product, heating the diacyl compound formed to split off the acyl radical in the 7-position in the form of acid with the production of a 7-dehydro cholesterol-ester and saponifying the latter compound.

11. The process which comprises reacting upon a 7-oxo-cholesterol ester with an alcoholate of a metal selected from the group consisting of earth metals, zirconium and magnesium to reduce the 7-keto group to the 7-hydroxyl group, benzoylating the hydroxyl groups of the reduction product, heating the dibenzoyl compound formed to split off the benzoyl radical in the 7-position in the form of benzoic acid with the production of 7-dehydro cholesterol-benzoate and saponifying the latter compound.

12. The process which comprises reacting upon 7-oxo-cholesterol acetate with an aluminium alcoholate to reduce the 7-oxo-group to the 7-hydroxyl group, benzoylating the hydroxyl groups of the reduction product, heating the dibenzoate formed to split off the benzoyl radical in the 7-position in the form of benzoic acid with the formation of 7-dehydrocholesterol monobenzoate and saponifying the latter compound.

13. The process which comprises reacting upon 7-oxo-cholesterol acetate with aluminium isopropylate to reduce the 7-oxo group to the 7-hydroxyl group, benzoylating the hydroxyl groups of the reduction product, heating the dibenzoate formed to split off the benzoyl radical in the 7-position in the form of benzoic acid with the formation of 7-dehydrocholesterol monobenzoate and saponifying the latter compound.

ADOLF WINDAUS.
FRIEDRICH SCHENCK.

Certificate of Correction

Patent No. 2,098,984.                                                            November 16, 1937.

ADOLF WINDAUS ET AL.

It is hereby certified that error appears in the printed specification of the above numbered patent requiring correction as follows: Page 1, first column, lines 11 to 18, inclusive, for the formula

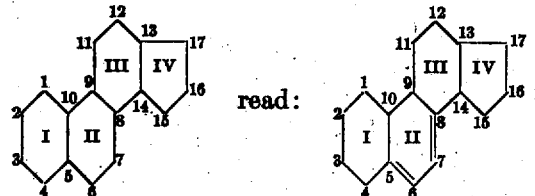

and that the said Letters Patent should be read with this correction therein that the same may conform to the record of the case in the Patent Office.

Signed and sealed this 1st day of March, A. D. 1938.

[SEAL]

HENRY VAN ARSDALE,
*Acting Commissioner of Patents.*

Disclaimer 2,098,984.—*Adolf Windaus* and *Friedrich Schenck*, Gottingen, Germany, DEHYDRO-STEROL COMPOUNDS AND MANUFACTURE THEREOF. Patent dated Nov. 16, 1937. Disclaimer filed Jan. 30, 1951, by the assignee, *E. I. du Pont de Nemours and Company.*

Hereby enters this disclaimer to claims 1 and 2 of said patent.
[*Official Gazette February 27, 1951.*]

Certificate of Correction

Patent No. 2,098,984.                                                                 November 16, 1937.

ADOLF WINDAUS ET AL.

It is hereby certified that error appears in the printed specification of the above numbered patent requiring correction as follows: Page 1, first column, lines 11 to 18, inclusive, for the formula

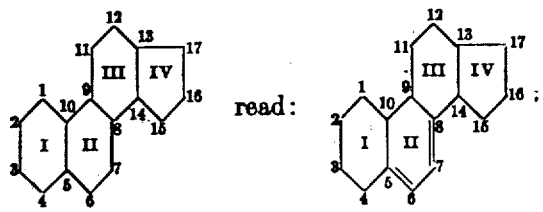

and that the said Letters Patent should be read with this correction therein that the same may conform to the record of the case in the Patent Office.

Signed and sealed this 1st day of March, A. D. 1938.

[SEAL]

HENRY VAN ARSDALE,
*Acting Commissioner of Patents.*

Disclaimer 2,098,984.—*Adolf Windaus* and *Friedrich Schenck*, Gottingen, Germany, DEHYDRO-STEROL COMPOUNDS AND MANUFACTURE THEREOF. Patent dated Nov. 16, 1937. Disclaimer filed Jan. 30, 1951, by the assignee, *E. I. du Pont de Nemours and Company*.

Hereby enters this disclaimer to claims 1 and 2 of said patent.
[*Official Gazette February 27, 1951.*]